(12) United States Patent
Arbel

(10) Patent No.: US 10,176,131 B1
(45) Date of Patent: Jan. 8, 2019

(54) CONTROLLING EXCLUSIVE ACCESS USING SUPPLEMENTAL TRANSACTION IDENTIFIERS

(71) Applicant: Xilinx, Inc., San Jose, CA (US)

(72) Inventor: Ygal Arbel, Morgan Hill, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/717,650

(22) Filed: Sep. 27, 2017

(51) Int. Cl.
    G06F 13/00 (2006.01)
    G06F 13/364 (2006.01)
    G06F 13/42 (2006.01)
    G06F 13/40 (2006.01)

(52) U.S. Cl.
    CPC .......... G06F 13/364 (2013.01); G06F 13/404 (2013.01); G06F 13/4234 (2013.01); *G06F 13/4022* (2013.01)

(58) Field of Classification Search
    CPC .. G06F 13/364; G06F 13/404; G06F 13/4234; G06F 13/4022
    See application file for complete search history.

(56) References Cited

U.S. PATENT DOCUMENTS

| | | | | |
|---|---|---|---|---|
| 5,548,780 | A * | 8/1996 | Krein | G06F 13/4036 710/108 |
| 8,612,648 | B1 | 12/2013 | Murray | |
| 2003/0126381 | A1* | 7/2003 | Vo | G06F 9/526 711/152 |
| 2013/0217115 | A1* | 8/2013 | Xu | C12Q 1/6851 435/320.1 |
| 2014/0052921 | A1* | 2/2014 | Biles | G06F 9/3834 711/125 |
| 2015/0234759 | A1* | 8/2015 | Tian | G06F 13/364 710/110 |
| 2015/0242334 | A1* | 8/2015 | Higham | G06F 3/061 711/163 |
| 2017/0052902 | A1* | 2/2017 | Ash | G06F 12/123 |
| 2018/0089083 | A1* | 3/2018 | Deshpande | G06F 12/0831 |

OTHER PUBLICATIONS

ARM Limited, "ARM® AMBA® 5 AHB Protocol Specification, AHB5, AHB-Lite," ARM IHI 0033B.b, copyright 2001, pp. 1-86, ARM Limited.

(Continued)

*Primary Examiner* — Jing-Yih Shyu
(74) *Attorney, Agent, or Firm* — LeRoy D. Maunu

(57) ABSTRACT

A circuit arrangement that includes master circuits generating access transactions, and each access transaction includes an address, a interconnect master identifier, and a system management master identifier. A slave circuit is coupled to the one or more master circuits and is configured to generate responses to the access transactions. Each response includes an interconnect master identifier from one of the plurality of access transactions. An interconnect circuit routes the access transactions to the slave circuit and routes the responses to the one or more master circuits according to the interconnect master identifiers. Exclusive access control circuitry controls exclusive access to the slave circuit based on the value of the system management master identifiers and addresses in the access transactions.

20 Claims, 5 Drawing Sheets

(56) References Cited

OTHER PUBLICATIONS

Mahesh et al., "Design and Implementation of AMBA based AXI 4 Slave Interface" International Journal of Innovative Research in Science, Engineering and Technology, Jun. 2015, pp. 1-8, vol. 4, Issue 6, International Journal of Emerging Researches in Engineering Science and Technology (IJEREST), Coimbatore, Tamilnadu, India.

Xilinx, "AXI Reference Guide," UG761 (v13.1), Mar. 7, 2011, pp. 1-82, Xilinx, Inc., San Jose, California, USA.

Xilinx, "Zynq UltraScale+ MPSoC Technical Reference Manual," UG1085 (v1.5), Mar. 31, 2017, pp. 1-1109, Xilinx, Inc., San Jose, California, USA.

\* cited by examiner

CONTROLLING EXCLUSIVE ACCESS USING SUPPLEMENTAL TRANSACTION IDENTIFIERS

TECHNICAL FIELD

The disclosure generally relates to managing exclusive access transactions.

BACKGROUND

Exclusive access transactions are used to prevent race conditions in multi-threaded applications. In the Advanced Reduced Instruction Set Computer (RISC) Machines (ARM) Advanced Microcontroller Bus Architecture (AMBA) Advanced Extensible Interface (AXI) protocol, "exclusive load" and "exclusive store" transactions are types of exclusive access transactions. Each transaction, exclusive or non-exclusive, includes an AXI transaction identifier (ID) that identifies the master circuit as the source of the transaction. The AXI ID is also used to manage exclusive access to a referenced address(es).

The AXI transaction ID is also used by interconnect circuitry between master circuits and slave circuits for routing responses from the slave circuits to the master circuits. In complex interconnect circuits, which can include buses, switches, and bridges, for example, the AXI ID can be changed by the interconnect circuitry and cause problems in controlling exclusive access. For example, a system having 16 master circuits may require only 4 bits to uniquely identify the master circuits in an AXI ID. Depending on the complexity of the interconnect circuitry, the actual AXI ID may be much larger, for example, 12 bits. The large AXI word size is costly and not scalable to larger systems and complex interconnect topologies. In some implementations the large AXI ID is compressed, which in many cases leads to improper transport of exclusive access transactions.

SUMMARY

A disclosed circuit arrangement includes one or more master circuits configured to generate a plurality of access transactions including non-exclusive access transactions and exclusive access transactions. Each of the plurality of access transactions includes an address, a interconnect master identifier, and a system management master identifier. A slave circuit is coupled to the one or more master circuits. The slave circuit is configured to generate respective responses to the access transactions, and each respective response includes an interconnect master identifier from one of the plurality of access transactions. An interconnect circuit is coupled to the one or more master circuits and to the slave circuit. The interconnect circuit is configured to route the access transactions to the slave circuit and route the respective responses to the one or more master circuits according to the interconnect master identifiers. Exclusive access control circuitry is coupled to receive the plurality of access transactions and is coupled to the slave circuit. The exclusive access control circuitry is configured to control exclusive access to the slave circuit based on the system management master identifiers and addresses in the plurality of access transactions.

Another disclosed circuit arrangement includes one or more master circuits configured to generate a plurality of access transactions including non-exclusive load transactions, non-exclusive store transactions, exclusive load transactions, and exclusive store transactions. Each of the plurality of access transactions includes an address, an interconnect master identifier, and a system management master identifier of one of the master circuits that generated the access transaction. A memory circuit is coupled to the one or more master circuits. The memory circuit is configured to generate respective responses to the access transactions, and each respective response includes the interconnect master identifier from one of the plurality of access transactions. An interconnect circuit is coupled to the one or more master circuits and to the memory circuit. The interconnect circuit is configured to route the access transactions to the memory circuit and route the respective responses to the one or more master circuits according to the interconnect master identifiers. Exclusive access control circuitry is coupled to receive the plurality of access transactions from the interconnect circuit and is coupled to the memory circuit. The exclusive access control circuitry is configured to store addresses associated with system management master identifiers specified in the exclusive load transactions in one or more lookup circuits associated with the system management master identifiers. The exclusive access control circuitry is further configured to control access to the memory circuit based on the stored addresses associated with system management master identifiers and addresses and system management master identifiers specified in the exclusive store transactions.

A disclosed method includes generating by one or more master circuits, a plurality of access transactions including non-exclusive load transactions, non-exclusive store transactions, exclusive load transactions, and exclusive store transactions. Each of the plurality of access transactions includes an address, an interconnect identifier, and a system management master identifier of one of the master circuits that generated the access transaction. The method further includes generating respective responses to the access transactions by a memory circuit. Each respective response includes an interconnect master identifier from one of the plurality of access transactions. The method further includes routing the access transactions to the memory circuit and routing the respective responses to the one or more master circuits according to the interconnect master identifiers. Addresses associated with system management master identifiers specified in the exclusive load transactions are stored in one or more lookup circuits associated with the system management master identifiers. The method controls access to the memory circuit based on the stored addresses associated with system management master identifiers and addresses and system management master identifiers specified in the exclusive store transactions.

Other features will be recognized from consideration of the Detailed Description and Claims, which follow.

BRIEF DESCRIPTION OF THE DRAWINGS

Various aspects and features of the system and method will become apparent upon review of the following detailed description and upon reference to the drawings in which.

DETAILED DESCRIPTION

Figure 1:
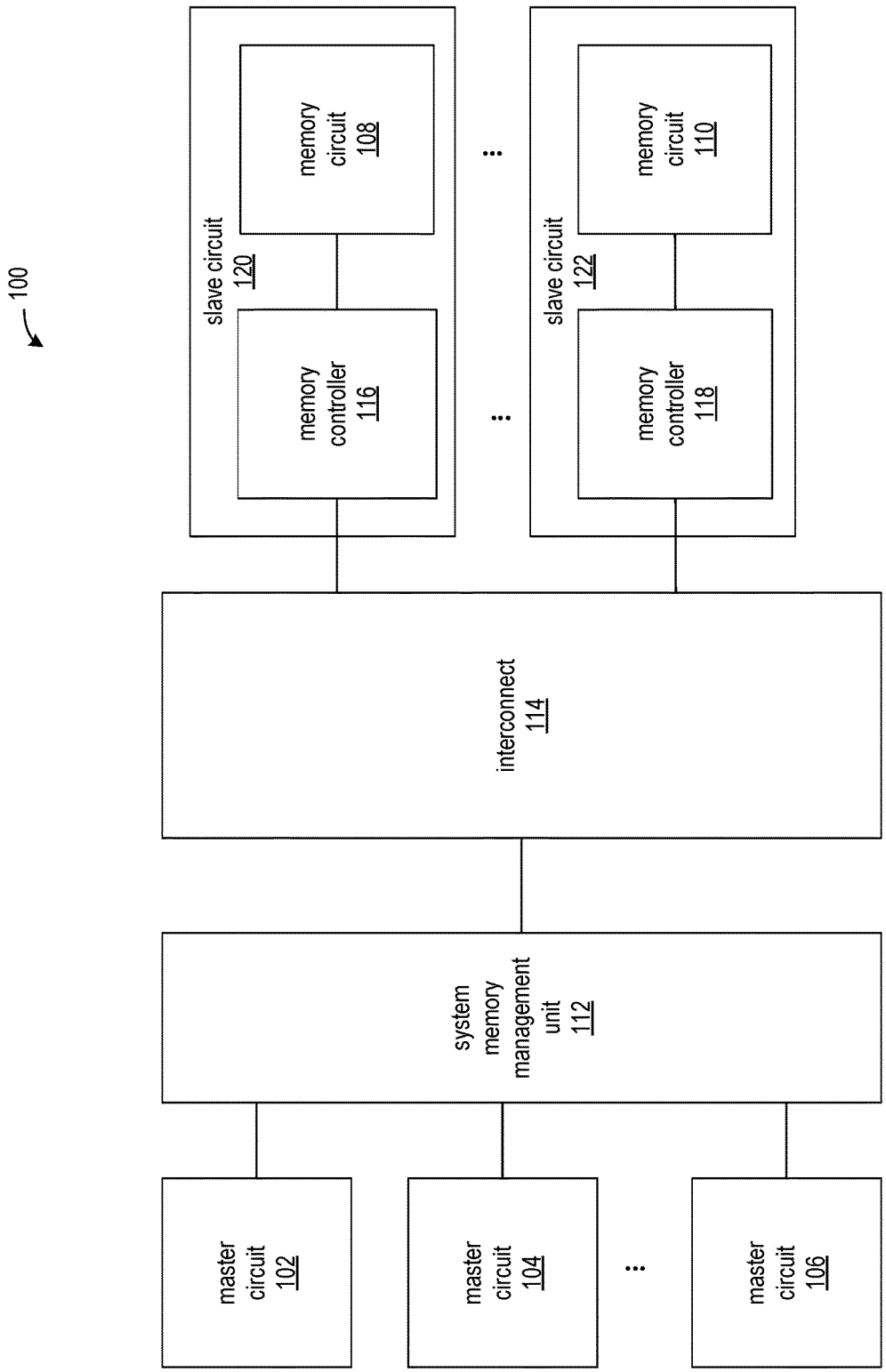
FIG. 1 shows an exemplary circuit arrangement having multiple master circuits coupled to one or more slave circuits.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed circuitry and methods use system management master identifiers, which are in addition to interconnect master identifiers, in exclusive access transactions to manage exclusive access. The exclusive access control circuitry, which conventionally would use the interconnect master identifiers to manage exclusive access transactions, instead uses the system management master identifiers which are included in the transactions. The system management master identifier in a transaction, which is conventionally used for other purposes, such as context selection for master circuits processing streaming data and for limiting access to slave circuits by certain master circuits, replaces the interconnect master identifier as the identifier used for managing exclusive access. The interconnect master identifiers are used for routing responses in combination with the system management master identifiers being used for controlling exclusive access.

By using the system management master identifier instead of the interconnect master identifier, the problems associated with compression of the interconnect master identifier, such as in the AXI protocol, are avoided. In addition, no additional cost is incurred by using the system management master identifier, as each transaction in the exemplary implementation has a system management master identifier for purposes other than managing exclusive access.

In accordance with the disclosed circuits and methods, one or more master circuits are configured to generate access transactions targeted to slave circuits. The access transactions include non-exclusive access transactions and exclusive access transactions. Each access transaction includes an address, an interconnect master identifier, and a system management master identifier. The interconnect master identifier is used in routing responses from the addressed slave circuit to the master circuit that was the source of an access request. A slave circuit is configured to generate respective responses to the access transactions. Each response includes the interconnect master identifier from one of the plurality of access transactions. An interconnect circuit couples the master circuit(s) to the slave circuit. The interconnect circuit routes the access transactions to the slave circuit and routes the responses to the master circuit(s) according to the interconnect master identifiers. Exclusive access to the slave circuit is managed by an exclusive access control circuit. The exclusive access control circuit manages exclusive access to the slave circuit based on the value of the system management master identifiers and addresses in the access transactions.

FIG. 1 shows an exemplary circuit arrangement 100 having multiple master circuits 102, 104, . . . , 106 coupled to one or more slave circuits 120, . . . , 122. The master circuits can be connected to the slave circuits by a system memory management unit (SMMU) 112 and an interconnect circuit 114. The master circuits can be central processing units (CPUs), graphics processing units (GPUs), input/output (I/O) circuits, or circuits implemented in field programmable gate array (FPGA) logic, for example. In the exemplary circuit arrangement 100, the slave circuits are memory arrangements, as exclusive access controls are typically used to control memory access. The memory arrangement of slave circuit 120 includes a memory controller 116 and a memory circuit 108, and the memory arrangement of slave circuit 122 includes memory controller 118 and memory circuit 110. Those skilled in the art will recognize that other types of slave circuits may also provide exclusive access controls.

The master circuits 102, 104, . . . , 106 generate and issue access transactions directed to the slave circuits 120, . . . , 122. Each access transaction includes an address and both an interconnect master identifier and a system management master identifier.

In responding to an access request, a slave circuits includes the interconnect master identifier in the response, and the interconnect circuit 114 routes the response accordingly.

The SMMU translates addresses of incoming access requests from the master circuits 102, 104, . . . , 106 to the physical memory addresses of the slave circuits 120, . . . , 122 and performs checks for permission to access that physical address, based on the information provided in translation page-tables (not shown). In a particular implementation, the SMMU performs address translation of an incoming AXI address and AXI ID (mapped to context) to an outgoing address.

The interconnect circuit can be a collection of buses, bridges, and/or switches, for example, depending on implementation requirements.

The system management IDs (SMIDs) of the master circuits can be used to manage exclusive access to the slave circuits instead of the interconnect master identifiers that are used by the interconnect protocol to route access requests. For example, in a specific interconnect implementation, the SMIDs are used instead of AXI IDs to manage exclusive access requests. The SMID can be used for controlling exclusive access as well as for other purposes. For example, the SMID can be used to select different memory contexts (address spaces) for different processors. In addition, the SMID can be used for access control to different memories, address ranges, and/or I/O peripherals.

Exclusive access control circuitry (not shown), which may be implemented in the memory controllers 116, 118 or inside a CPU multi-core cluster as part of the cache, is coupled to receive the access transactions from the master circuit. Based on the values of the system management master identifiers and addresses in the access transactions, the exclusive access control circuitry controls exclusive access to the slave circuits.

Figure 2:
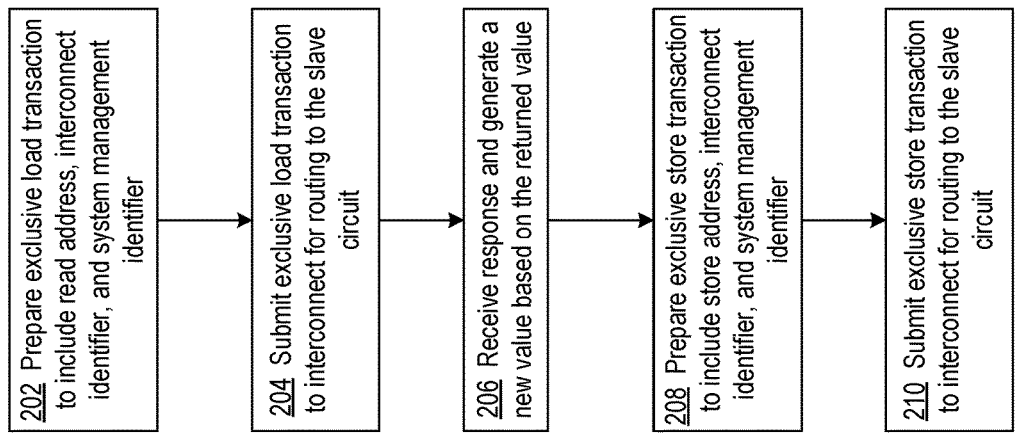
FIG. 2 shows an exemplary process performed by a master circuit in issuing exclusive access transactions.

FIG. 2 shows an exemplary process performed by a master circuit in issuing exclusive access transactions. In one implementation, the master circuit issues an exclusive load transaction to read a value(s) from a specified address(es) and to signal to exclusive access control circuitry that the master circuit will subsequently issue an exclusive store transaction to the same address(es) after performing some application-specific operation on the data.

At block 202, the master circuit prepares an exclusive load transaction. The exclusive load transaction includes an address from which data is to be read, an interconnect master identifier, and a system management master identifier. The interconnect master identifier can be specified in bits of the transaction that the interconnect protocol defines for master circuits, and the system management master identifier can be specified in bits of the transaction the protocol leaves available for application-specific uses.

In some implementations, the access transactions issued from a single master circuit can have different SMIDs. For example, the master circuit can be a multi-core processor and the cores can be assigned different SMIDs. Different threads executing on a multi-core or single core processor can also be assigned different SMIDs. In an exemplary implementation, each SMID can include a subset of bits of an interconnect master identifier.

At block 204, the master circuit submits the exclusive load transaction to interconnect circuitry for routing to the addressed slave circuit. The transaction can be issued to an SMMU, and the SMMU can transmit the transaction to the interconnect circuitry in some implementations.

At block 206, the master circuit receives the response from the slave circuit and generates a new value to be stored at the same address from which the returned value was loaded. The new value can be a function of the returned value in some applications.

The master circuit prepares an exclusive store transaction at block 208. The exclusive store transaction includes the same address as the exclusive load transaction of block 202, the same interconnect master identifier, and the same system management master identifier. The exclusive store transaction also includes the data generated at block 206. The data is to be stored at the address specified in the transaction.

At block 210, the master circuit submits the exclusive store transaction to the interconnect circuitry for routing to the slave circuit. The master circuit subsequently receives a response (not shown) indicating success or failure of the store transaction from the addressed slave circuit or exclusive access control circuitry.

Figure 3:
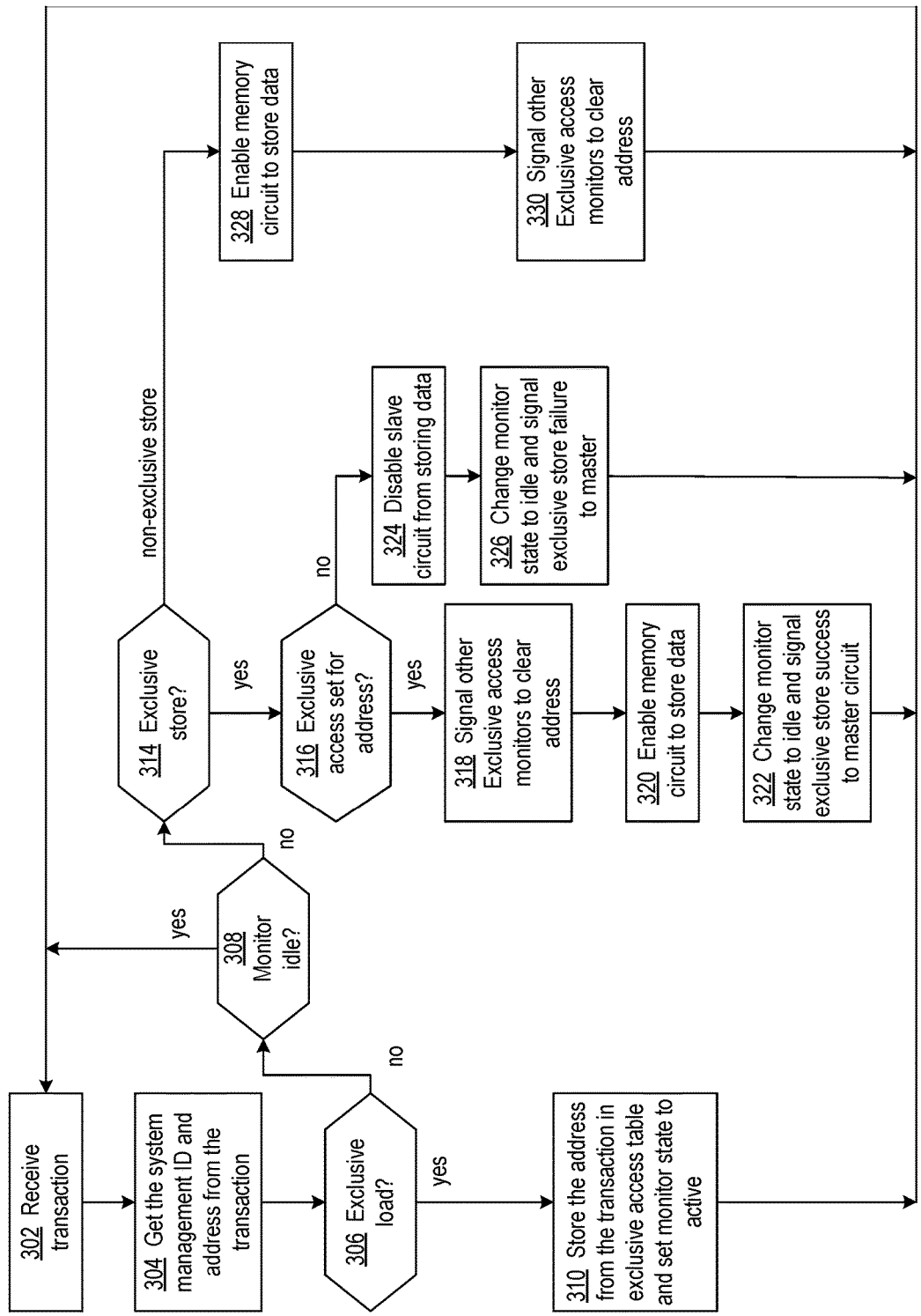
FIG. 3 shows a flowchart of an exemplary process performed by exclusive access control circuitry in managing exclusive access transactions.

FIG. 3 shows a flowchart of an exemplary process performed by exclusive access control circuitry in managing exclusive access transactions. The exclusive access control circuitry includes multiple exclusive access monitors in an exemplary implementation. Each slave circuit has an exclusive access monitor for each master circuit. For example, if a system includes 8 master circuits, each slave circuit that supports exclusive access transactions would have 8 exclusive access monitors. Some implementations can have fewer monitors than master circuits if, for example, the application does not have all master circuits active simultaneously. In general, a monitor can be dynamically allocated to a master circuit if a monitor is not already assigned to it, making the association between monitor and master circuit dynamic. Each exclusive access monitor is associated with one of the master circuits in the system. Each exclusive access monitor is responsive to transactions having the SMID of the master circuit associated with the monitor. The process of FIG. 3 illustrates the processing performed by one exclusive access monitor. Note that FIG. 3 does not illustrate a control path for non-exclusive load transactions, as no exclusive access needs to be managed.

At block 302, the exclusive access control circuitry receives an exclusive access transaction, and at block 304, the SMID is retrieved from the transaction. As explained above, the SMID can be stored in the user data bits portion of the transaction rather than the bits assigned to transactions by the interconnect protocol for identifying master circuits.

At decision block 306, the exclusive access control circuitry determines if the transaction is an exclusive load transaction based on the operation code in the transaction. If the transaction is an exclusive load transaction, at block 310, the exclusive access monitor stores the address specified in the transaction in an exclusive access table associated with the master circuit. The address(es) to which the master circuit has issued an exclusive load transaction(s) is stored in an exclusive access table associated with the master circuit. Also at block 310 the state of the monitor, which is a two-state state machine, is changed from idle to active if the monitor is not already in an active state. Completion (success or failure) of the exclusive access changes the state from active to idle, as do some other conditions. The process then returns to block 302 to receive the next transaction.

If the transaction received at block 302 is not an exclusive load transaction, decision block 306 directs the process to decision block 308. If the monitor is in an idle state, the process returns to block 302 to receive the next transaction. Otherwise, the monitor is in an active state and continues at block 314. At decision block 314, at which the exclusive access monitor determines if the transaction is an exclusive store transaction. For an exclusive store transaction referencing the same address as the exclusive load transaction of block 310, at decision block 316 the exclusive access monitor determines whether exclusive access is set for the address specified in the exclusive store transaction by looking up the address in the exclusive access table. If the address of the exclusive store transaction is present in the exclusive access table, at block 318 the exclusive access monitor signals the other exclusive access monitor(s) to clear the address from the exclusive access table(s) maintained by the other exclusive access monitor(s).

At block 320, the exclusive access monitor enables the slave circuit to store the data of the exclusive store transaction by transmitting an enable signal to the slave circuit. At block 322, the exclusive access monitor changes to an idle state and signals the master circuit that issued the exclusive store transaction that the store was successful. The signal can be carried in one or more bits of a multi-bit response transmitted via the interconnect circuitry.

If the address of the exclusive access transaction is not present in the exclusive access table, at block 324 the exclusive access monitor disables the slave from storing the data specified by the transaction by transmitting a disable signal to the slave circuit. At block 326, the exclusive access monitor changes to an idle state and signals the master circuit that issued the exclusive store transaction that the store failed. The signal can be carried in one or more bits of multi-bit response transmitted via the interconnect circuitry.

In response to a non-exclusive store transaction, the exclusive access monitor at block 328 enables the slave circuit to store the data of the store transaction by transmitting an enable signal to the slave circuit. At block 330 the exclusive access monitor signals the other exclusive access monitor(s) to clear the address from the exclusive access table(s) maintained by the other exclusive access monitor(s).

Figure 4:
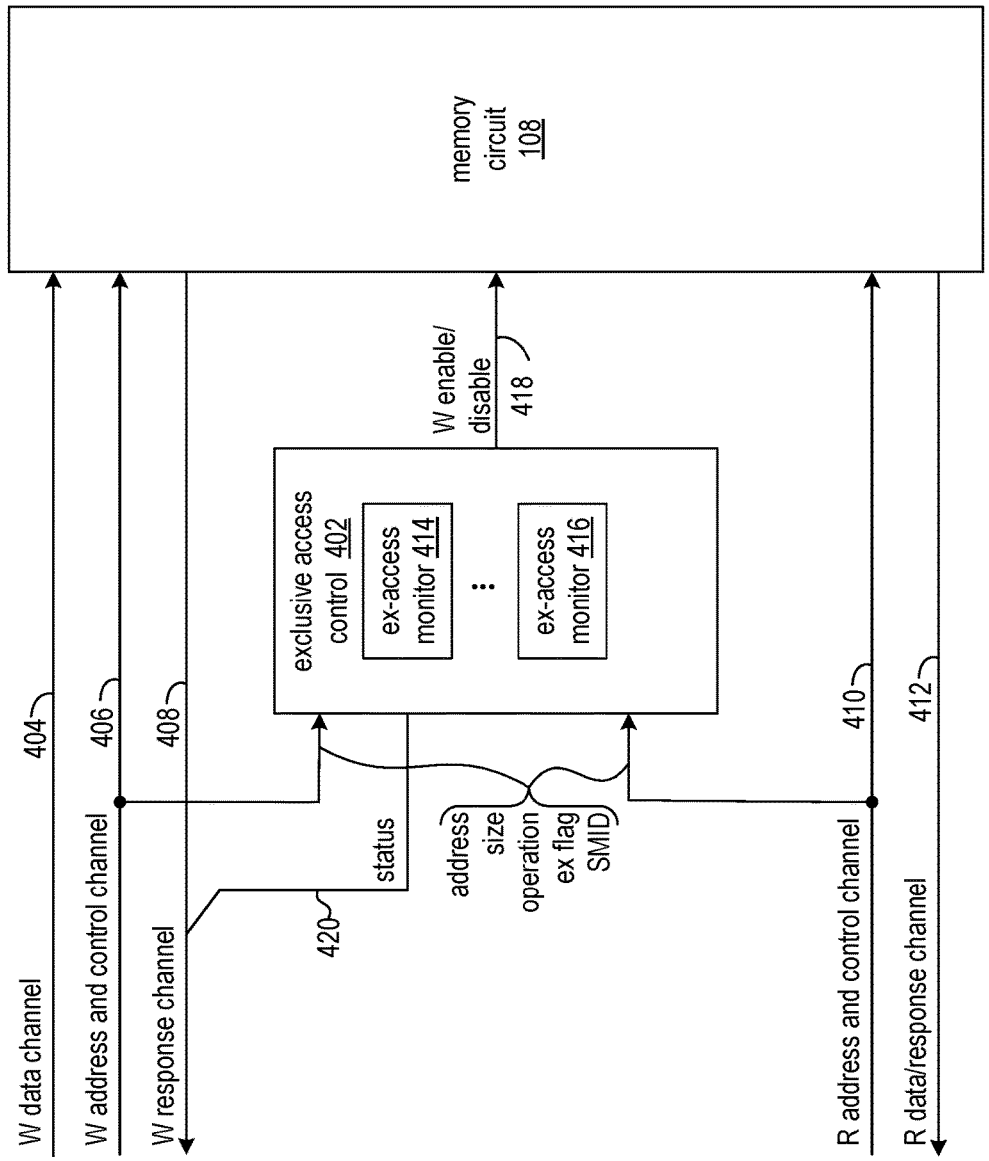
FIG. 4 shows a circuit arrangement in which exclusive access control circuitry controls exclusive access transactions targeted to a memory circuit.

FIG. 4 shows a circuit arrangement in which exclusive access control circuitry 402 controls exclusive access transactions targeted to a memory circuit 108. Exclusive access requests can be carried by the interconnect circuitry on separate write and read channels. The write channel includes a write data channel 404, a write address and control channel 406, and a write response channel 408. The read channel includes a read address and control channel 410 and a read data and response channel 412. The exclusive access control circuitry receives, for each transaction, the address, size, operation signal, exclusive access flag, and SMID from the write address and control channel 406 and the read address and control channel 410.

The exclusive access control circuitry 402 includes exclusive access monitors 414, . . . 416. The exclusive access control circuitry 402 includes respective exclusive access monitors 414, . . . 416 for the SMIDs used by master circuit(s) in issuing exclusive access transactions. The exclusive access monitors are coupled to receive the address, size, operation code, exclusive access flag, and SMID of each transaction. Each exclusive access monitor is responsive to a different SMID. For example, exclusive access monitor 414 is responsive to one SMID and the exclusive access monitor 416 is responsive to another different SMID.

Each exclusive access monitor can have an exclusive access table implemented as a lookup circuit (not shown) by a content addressable memory, for example, for managing exclusive access transactions. Each exclusive access monitor is coupled to provide the write enable/disable signal 418 to the memory circuit.

In response to the presence of the address of an exclusive store transaction in the exclusive access table associated with the SMID in the exclusive store transaction, the exclusive access monitor enables the memory circuit 108 to store data of the exclusive store transaction by forcing the enable/disable signal 418 into an enable state, and generates a status signal 420 that indicates success of the exclusive store transaction. The status signal is communicated on the write response channel 408 as a bit having a state indicative of the success. In response to the absence of the address of an exclusive store transaction in the exclusive access table associated with the SMID in the exclusive store transaction, the exclusive access monitor disables the memory circuit from storing data of the exclusive store transaction by forcing the enable/disable signal 418 into a disable state, and generates a status signal 420 that indicates failure of the exclusive store transaction. The status signal is communicated on the write response channel 408 as a bit having a state indicative of the failure.

Figure 5:
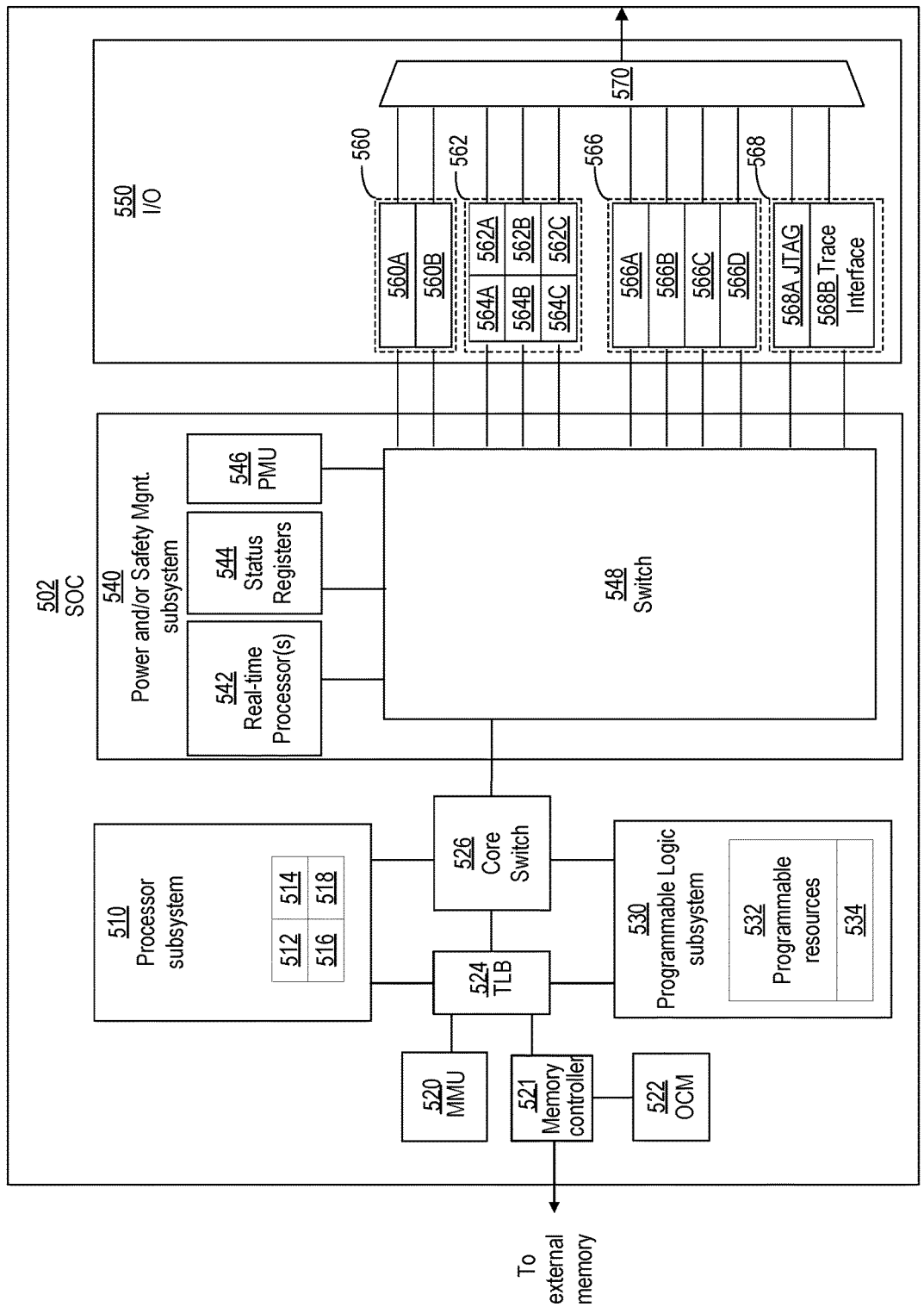
FIG. 5 shows an exemplary programmable IC that can be configured in accordance with the disclosed circuitry.

FIG. 5 shows an exemplary programmable IC 502 that can be configured in accordance with the disclosed circuitry. The programmable IC may also be referred to as a System On Chip (SOC), which includes a processor subsystem 510 and a programmable logic subsystem 530. The processor subsystem 510 may be programmed to implement a software portion of the user design, via execution of a user program. The program may be specified as part of a configuration data stream or may be retrieved from an on-chip or off-chip data storage device. The processor subsystem 510 may include various circuits 512, 514, 516, and 518 for executing one or more software programs. The circuits 512, 514, 516, and 518 may include, for example, one or more processor cores, floating point units (FPUs), an interrupt processing unit, on chip-memory, memory caches, and/or cache coherent interconnect.

The programmable logic subsystem 530 of the programmable IC 502 may be programmed to implement a hardware portion of a user design. For instance, the programmable logic subsystem may include a number of programmable resources 532, which may be programmed to implement a set of circuits specified in a configuration data stream. The programmable resources 532 include, for example, programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 532 may be programmed by loading a configuration data stream into the configuration memory cells, which define how the programmable interconnect circuits and programmable logic circuits are configured. For example, setting a configuration memory cell for a configurable latch to a first value may direct the configurable latch to operate as a single-edge-driven latch. Setting the configuration memory cell to a second value may direct the configurable latch to operate as a double-edge-driven latch. The collective states of the individual memory cells then determine the function of the programmable resources 532. The configuration data can be read from memory (e.g., from an external PROM) or written into the programmable IC 502 by an external device. In some implementations, a configuration controller 534 included in the programmable logic subsystem 530 may program the programmable resources, in response to powering on the programmable IC, by retrieving configuration data from a non-volatile memory coupled to the programmable IC and loading the configuration data into the configuration memory cells. In some other implementations, the configuration data may be loaded into the configuration memory cells by a start-up process executed by the processor subsystem 510.

The programmable IC 502 may include various circuits to interconnect the processor subsystem 510 with circuitry implemented within the programmable logic subsystem 530. In this example, the programmable IC 502 includes a core switch 526 that can route data signals between various data ports of the processor subsystem 510 and the programmable logic subsystem 530. The core switch 526 may also route data signals between either of the programmable logic or processor subsystems 530 and 510 and various other circuits of the programmable IC, such as an internal data bus. Alternatively or additionally, the processor subsystem 510 may include an interface to directly connect with the programmable logic subsystem—bypassing the core switch 526. Such an interface may be implemented, for example, using the AMBA AXI Protocol Specification (AXI) as published by ARM.

In some implementations, the processor subsystem 510 and the programmable logic subsystem 530 may also read from or write to memory locations of an on-chip memory 522 or off-chip memory (not shown) via memory controller 521. The memory controller 521 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 521 is able to communicate is provided for purposes of illustration only and is not intended as a limitation or to be exhaustive. As shown in FIG. 5, the programmable IC 502 may include a memory management unit 520 and translation look-aside buffer 524 to translate virtual memory addresses used by the subsystems 510 and 530 to physical memory addresses used by the memory controller 521 to access specific memory locations.

The programmable IC may include an input/output (I/O) subsystem 550 for communication of data with external circuits. The I/O subsystem 550 may include various types of I/O devices or interfaces including for example, flash memory type I/O devices, higher performance I/O devices, lower performance interfaces, debugging I/O devices, and/or RAM I/O devices.

The I/O subsystem 550 may include one or more flash memory interfaces 560 illustrated as 560A and 560B. For example, one or more of flash memory interfaces 560 can be implemented as a Quad-Serial Peripheral Interface (QSPI) configured for 4-bit communication. One or more of flash memory interfaces 560 can be implemented as a parallel 8-bit NOR/SRAM type of interface. One or more of flash memory interfaces 560 can be implemented as a NAND interface configured for 8-bit and/or 16-bit communication. It should be appreciated that the particular interfaces described are provided for purposes of illustration and not limitation. Other interfaces having different bit widths can be used.

The I/O subsystem 550 can include one or more interfaces 562 providing a higher level of performance than flash memory interfaces 560. Each of interfaces 562A-562C can be coupled to a DMA controller 564A-564C respectively. For example, one or more of interfaces 562 can be implemented as a Universal Serial Bus (USB) type of interface. One or more of interfaces 562 can be implemented as a gigabit Ethernet type of interface. One or more of interfaces 562 can be implemented as a Secure Digital (SD) type of interface.

The I/O subsystem 550 may also include one or more interfaces 566 such as interfaces 566A-566D that provide a lower level of performance than interfaces 562. For example, one or more of interfaces 566 can be implemented as a General Purpose I/O (GPIO) type of interface. One or more of interfaces 566 can be implemented as a Universal Asynchronous Receiver/Transmitter (UART) type of interface. One or more of interfaces 566 can be implemented in the form of a Serial Peripheral Interface (SPI) bus type of interface. One or more of interfaces 566 can be implemented in the form of a Controller-Area-Network (CAN) type of interface and/or an inter-integrated circuit (I²C) type of interface. One or more of interfaces 566 also can be implemented in the form of a timer type of interface.

The I/O subsystem 550 can include one or more debug interfaces 568 such as processor JTAG (PJTAG) interface 568A and a trace interface 568B. PJTAG interface 568A can provide an external debug interface for the programmable IC 502. Trace interface 568B can provide a port to receive debug, e.g., trace, information from the processor subsystem 510 or the programmable logic subsystem 530.

As shown, each of interfaces 560, 562, 566, and 568 can be coupled to a multiplexer 570. Multiplexer 570 provides a plurality of outputs that can be directly routed or coupled to external pins of the programmable IC 502, e.g., balls of the package within which the programmable IC 502 is disposed. For example, I/O pins of programmable IC 502 can be shared among interfaces 560, 562, 566, and 568. A user can configure multiplexer 570, via a configuration data stream to select which of interfaces 560-568 are to be used and, therefore, coupled to I/O pins of programmable IC 502 via multiplexer 570. The I/O subsystem 550, may also include a fabric multiplexer I/O (FMIO) interface (not shown) to connect interfaces 560-568 to programmable logic circuits of the programmable logic subsystem. Additionally or alternatively, the programmable logic subsystem 530 can be configured to implement one or more I/O circuits within programmable logic. In some implementations, the programmable IC 502 may also include a subsystem 540 having various circuits for power and/or safety management. For example, the subsystem 540 may include a power management unit 546 configured to monitor and maintain one or more voltage domains used to power the various subsystems of the programmable IC 502. In some implementations, the power management unit 546 may disable power of individual subsystems, when idle, to reduce power consumption, without disabling power to subsystems in use.

The subsystem 540 may also include safety circuits to monitor the status of the subsystems to ensure correct operation. For instance, the subsystem 540 may include one or more real-time processors 542 configured to monitor the status of the various subsystems (e.g., as indicated in status registers 544). The real-time processors 542 may be configured to perform a number of tasks in response to detecting errors. For example, for some errors, the real-time processors 542 may generate an alert in response to detecting an error. As another example, the real-time processors 542 may reset a subsystem to attempt to restore the subsystem to correct operation. The subsystem 540 includes a switch network 548 that may be used to interconnect various subsystems. For example, the switch network 548 may be configured to connect the various subsystems 510, 530, and 540 to various interfaces of the I/O subsystem 550. In some applications, the switch network 548 may also be used to isolate the real-time processors 542 from the subsystems that are to be monitored. Such isolation may be required by certain application standards (e.g., IEC-61508 SIL3 or ISO-26262 standards) to ensure that the real-time processors 542 are not affected by errors that occur in other subsystems.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for managing exclusive access transactions. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
   one or more master circuits configured to generate a plurality of access transactions including non-exclusive access transactions and exclusive access transactions, wherein each of the plurality of access transactions includes an address, an interconnect master identifier, and a system management master identifier;
   a slave circuit coupled to the one or more master circuits, wherein the slave circuit is configured to generate respective responses to the access transactions, and each respective response includes an interconnect master identifier from one of the plurality of access transactions;

an interconnect circuit coupled to the one or more master circuits and to the slave circuit, wherein the interconnect circuit is configured to route the access transactions to the slave circuit and route the respective responses to the one or more master circuits according to the interconnect master identifiers; and exclusive access control circuitry coupled to receive the plurality of access transactions and coupled to the slave circuit, wherein the exclusive access control circuitry is configured to control exclusive access to the slave circuit based on the system management master identifiers and addresses in the plurality of access transactions.

2. The circuit arrangement of claim 1, wherein the system management master identifier in at least one of the plurality of access transactions includes a subset of bits of the interconnect master identifier in the at least one of the plurality of access transactions.

3. The circuit arrangement of claim 1, wherein exclusive access control circuitry is further configured to:
store addresses associated with system management master identifiers specified in the exclusive access transactions; and
control exclusive access to the slave circuit based on the stored addresses.

4. The circuit arrangement of claim 1, wherein at least one of the one or more master circuits is configured to generate a first plurality of access requests having a first system management master identifier and a second plurality of access requests having a second system management master identifier not equal to the first system management master identifier.

5. A circuit arrangement comprising:
one or more master circuits configured to generate a plurality of access transactions including non-exclusive load transactions, non-exclusive store transactions, exclusive load transactions, and exclusive store transactions, wherein each of the plurality of access transactions includes an address, an interconnect master identifier, and a system management master identifier of one of the master circuits that generated the access transaction;
a memory circuit coupled to the one or more master circuits, wherein the memory circuit is configured to generate respective responses to the access transactions, and each respective response includes the interconnect master identifier from one of the plurality of access transactions;
an interconnect circuit coupled to the one or more master circuits and to the memory circuit, wherein the interconnect circuit is configured to route the access transactions to the memory circuit and route the respective responses to the one or more master circuits according to the interconnect master identifiers; and
exclusive access control circuitry coupled to receive the plurality of access transactions from the interconnect circuit and coupled to the memory circuit, the exclusive access control circuitry configured to:
store addresses associated with system management master identifiers specified in the exclusive load transactions in one or more lookup circuits associated with the system management master identifiers, and
control access to the memory circuit based on the stored addresses associated with system management master identifiers and addresses and system management master identifiers specified in the exclusive store transactions.

6. The circuit arrangement of claim 5, wherein the system management master identifier in at least one of the plurality of access transactions includes a subset of bits of the interconnect master identifier in the at least one of the plurality of access transactions.

7. The circuit arrangement of claim 5, further comprising a system memory management circuit coupled to the one or more master circuits and configured to translate addresses in the plurality of access transactions to context addresses for the one or more master circuits based on the system management master identifiers in the plurality of access transactions.

8. The circuit arrangement of claim 5, wherein the exclusive access control circuitry is further configured to disable the memory circuit from storing data of an exclusive store transaction in response to absence of the address of the exclusive store transaction in one of the one or more lookup circuits associated with the system management master identifier in the exclusive store transaction.

9. The circuit arrangement of claim 5, wherein the exclusive access control circuitry is further configured to enable the memory circuit to store data of an exclusive store transaction in response to presence of the address of the exclusive store transaction in one of the one or more lookup circuits associated with the system management master identifier in the exclusive store transaction.

10. The circuit arrangement of claim 9, wherein the exclusive access control circuitry is further configured to clear, in response to the exclusive store transaction, from each of the one or more lookup circuits an address that matches the address of an exclusive store transaction.

11. The circuit arrangement of claim 5, wherein at least one of the one or more master circuits is configured to generate a first plurality of access requests having a first system management master identifier and a second plurality of access requests having a second system management master identifier not equal to the first system management master identifier.

12. The circuit arrangement of claim 5, wherein the exclusive access control circuitry is further configured to:
enable the memory circuit to store data of an exclusive store transaction in response to presence of the address of the exclusive store transaction in one of the one or more lookup circuits associated with the system management master identifier in the exclusive store transaction; and
in response to absence of the address of the exclusive store transaction in one of the one or more lookup circuits associated with the system management master identifier in the exclusive store transaction:
disable the memory circuit from storing data of the exclusive store transaction,
generate a signal that indicates failure of the exclusive store transaction, and
include a bit having a state indicative of the failure of the exclusive store transaction in the respective response to a master circuit of the one or more master circuits identified by the system management master identifier of the exclusive store transaction.

13. A method comprising:
generating by one or more master circuits a plurality of access transactions including non-exclusive load transactions, non-exclusive store transactions, exclusive load transactions, and exclusive store transactions, wherein each of the plurality of access transactions includes an address, an interconnect identifier, and a system management identifier of one of the master circuits that generated the access transaction;

generating respective responses to the access transactions by a memory circuit, wherein each respective response includes an interconnect master identifier from one of the plurality of access transactions;

routing the access transactions to the memory circuit and routing the respective responses to the one or more master circuits according to the interconnect master identifiers;

storing addresses associated with system management master identifiers specified in the exclusive load transactions in one or more lookup circuits associated with the system management master identifiers; and controlling access to the memory circuit based on the stored addresses associated with system management master identifiers and addresses and system management master identifiers specified in the exclusive store transactions.

14. The method of claim 13, wherein the system management master identifier in at least one of the plurality of access transactions includes a subset of bits of the interconnect master identifier in the at least one of the plurality of access transactions.

15. The method of claim 13, further comprising translating by a system memory management circuit coupled to the one or more master circuits, addresses in the plurality of access transactions to context addresses for the one or more master circuits based on the system management master identifiers in the plurality of access transactions.

16. The method of claim 13, further comprising disabling the memory circuit from storing data of an exclusive store transaction in response to absence of the address of the exclusive store transaction in one of the one or more lookup circuits associated with the system management master identifier in the exclusive store transaction.

17. The method of claim 13, further comprising enabling the memory circuit to store data of an exclusive store transaction in response to presence of the address of the exclusive store transaction in one of the one or more lookup circuits associated with the system management master identifier in the exclusive store transaction.

18. The method of claim 17, further comprising clearing, in response to the exclusive store transaction, from each of the one or more lookup circuits an address that matches the address of an exclusive store transaction.

19. The method of claim 13, further comprising generating by at least one of the one or more master circuits, a first plurality of access requests having a first system management master identifier and a second plurality of access requests having a second system management master identifier not equal to the first system management master identifier.

20. The method of claim 13, further comprising:

enabling the memory circuit to store data of an exclusive store transaction in response to presence of the address of the exclusive store transaction in one of the one or more lookup circuits associated with the system management master identifier in the exclusive store transaction; and in response to absence of the address of the exclusive store transaction in one of the one or more lookup circuits associated with the system management master identifier in the exclusive store transaction:

disabling the memory circuit from storing data of the exclusive store transaction, generating a signal that indicates failure of the exclusive store transaction, and including a bit having a state indicative of the failure of the exclusive store transaction in the respective response to a master circuit of the one or more master circuits identified by the system management master identifier of the exclusive store transaction.

\* \* \* \* \*